United States Patent [19]

de Virel

[11] Patent Number: 4,707,736
[45] Date of Patent: Nov. 17, 1987

[54] SELF ALIGNMENT DEVICE FOR AN OPTICAL INFRARED IMAGE OBSERVATION SYSTEM

[75] Inventor: Dufresne de Virel, Paris, France
[73] Assignee: Thomson CSF, Paris, France
[21] Appl. No.: 897,352
[22] Filed: Aug. 18, 1986

[30] Foreign Application Priority Data

Aug. 20, 1985 [FR] France .................. 85 12531

[51] Int. Cl.$^4$ .................. H04N 5/33; H04N 7/18
[52] U.S. Cl. .................. 358/113; 250/334
[58] Field of Search .................. 358/113, 122, 109; 250/332, 334

[56] References Cited

U.S. PATENT DOCUMENTS

| | | | |
|---|---|---|---|
| 4,152,729 | 5/1979 | Hobbs | 358/222 |
| 4,383,474 | 5/1983 | Paurus | 356/141 |
| 4,450,479 | 5/1984 | Horne | 358/113 |

FOREIGN PATENT DOCUMENTS

| | | |
|---|---|---|
| 2357864 | 3/1978 | France . |
| 684292 | 12/1952 | United Kingdom . |
| 2138926 | 10/1984 | United Kingdom . |

Primary Examiner—Howard W. Britton
Attorney, Agent, or Firm—Cushman, Darby & Cushman

[57] ABSTRACT

A self-alignment device is provided for an optical infrared image observation system having essentially an input optical system, and infrared reading system, as well as a return mirror in a given position situated in the field of the optical input system so that the infrared reading system may see its own image in this mirror. Deviation measuring and slaving systems allow centering of the image to adjusted with respect to the position of the return mirror.

8 Claims, 12 Drawing Figures

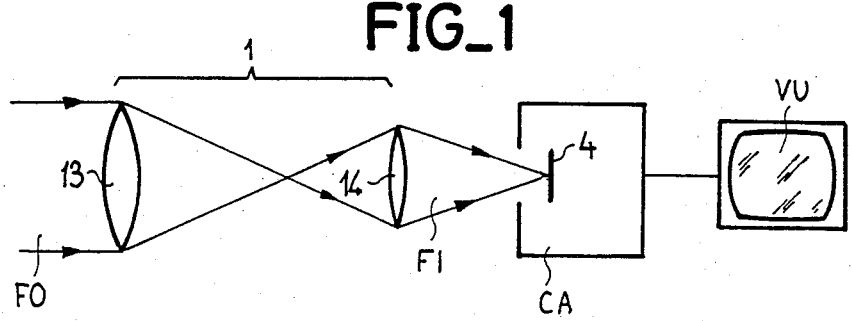
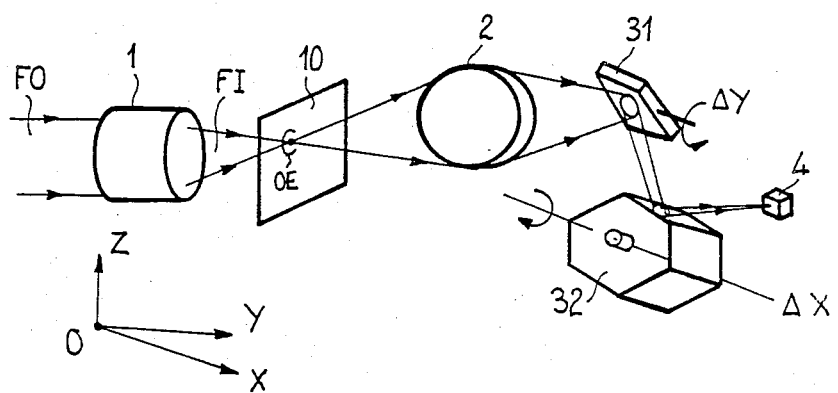
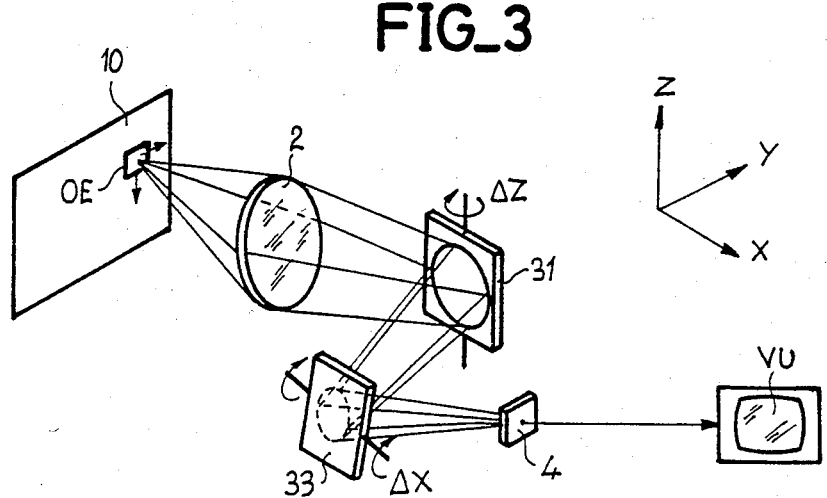

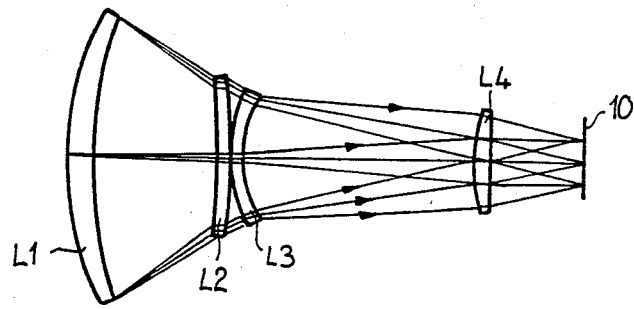
FIG_4
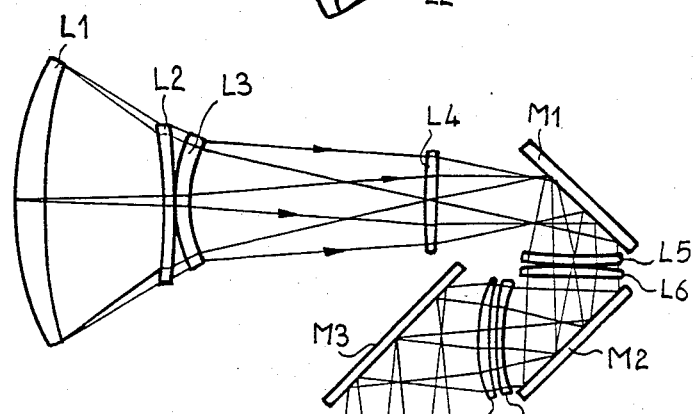
FIG_5
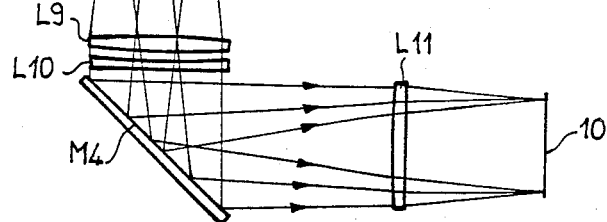
FIG_6
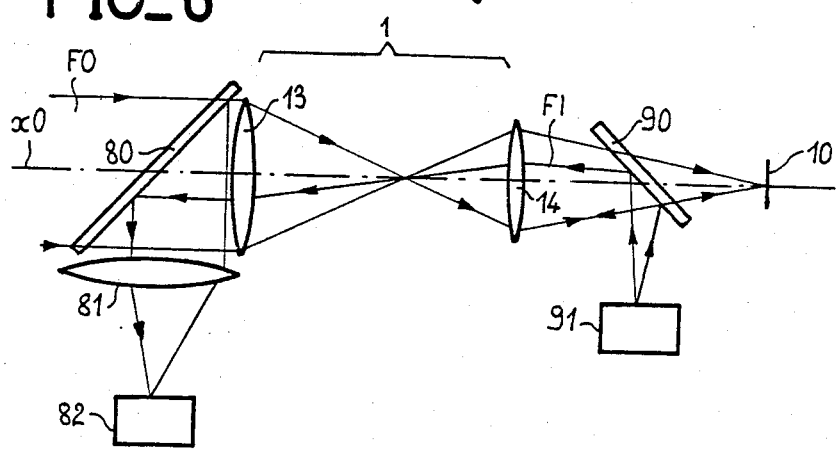

FIG_7
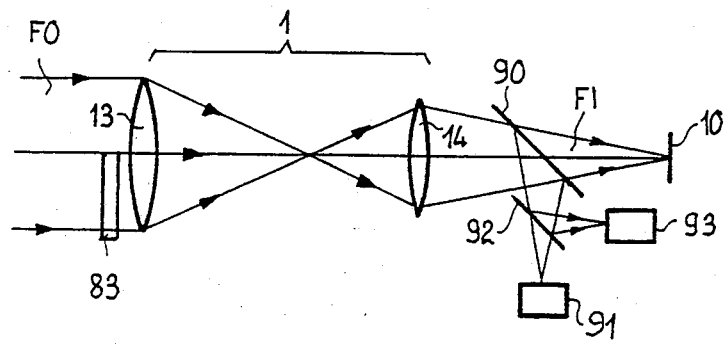
FIG_8
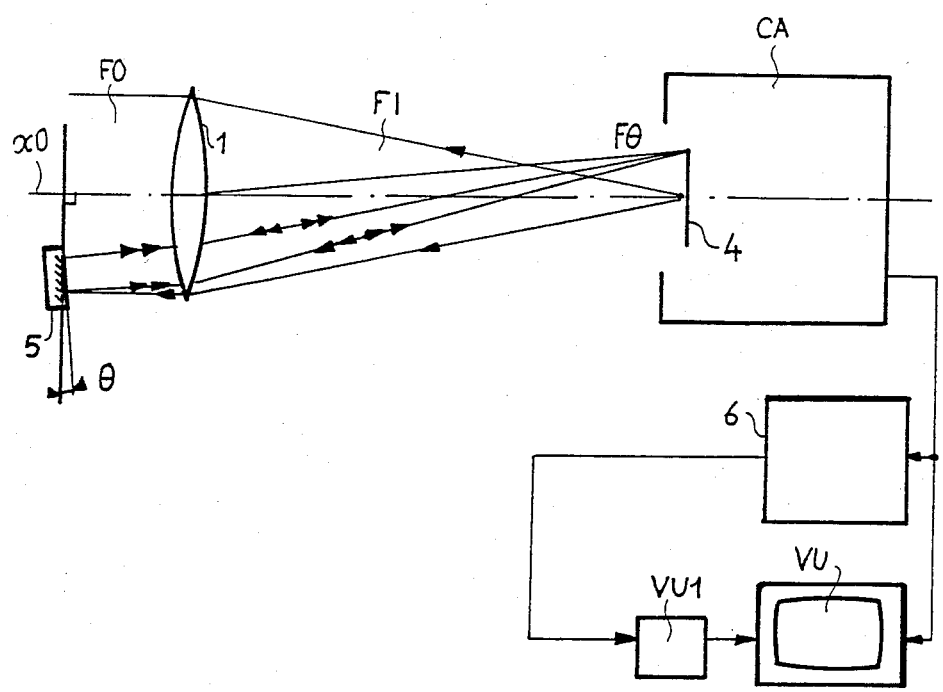

FIG_9
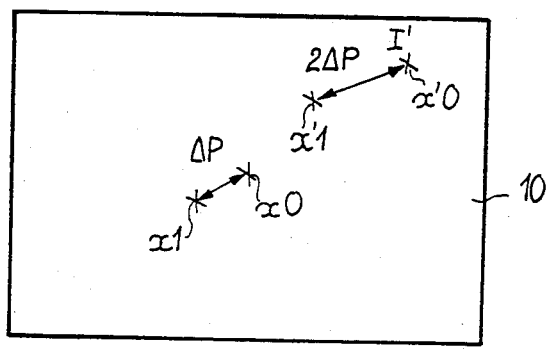
FIG_10
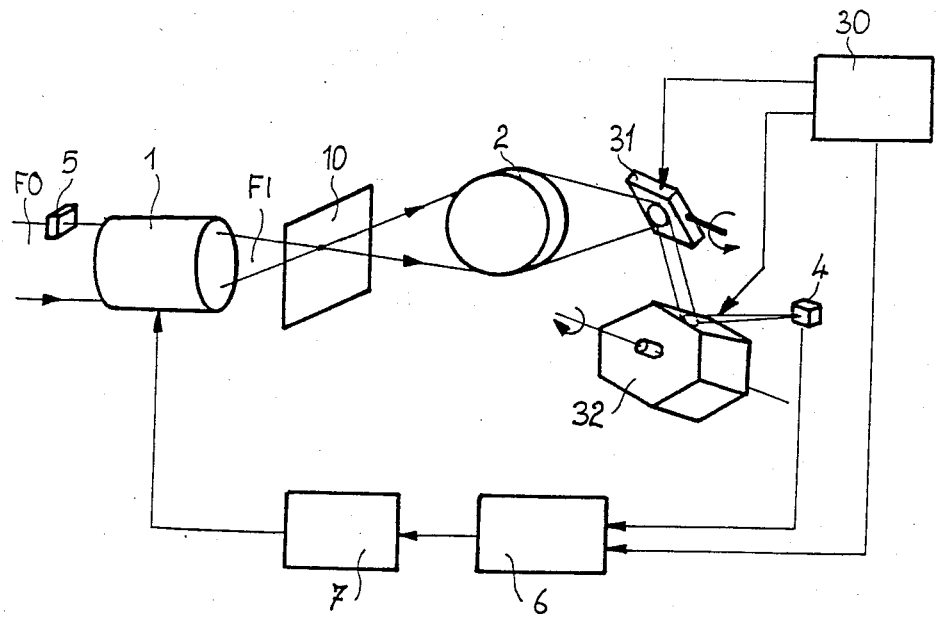

FIG_11
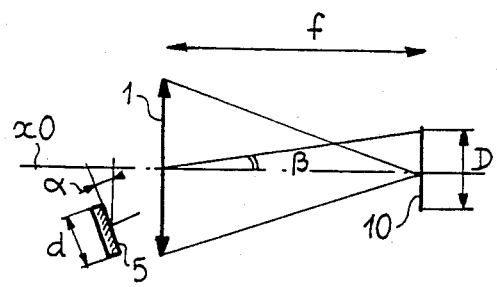
FIG_12
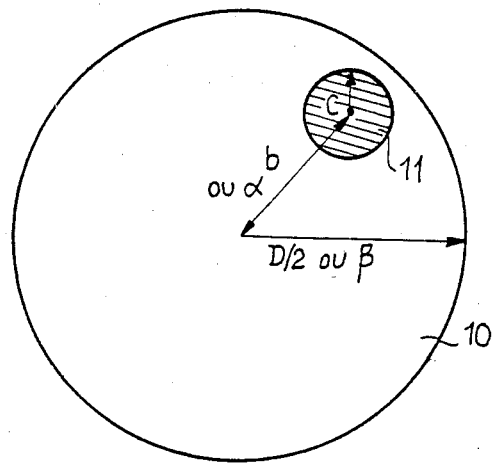

4,707,736

SELF ALIGNMENT DEVICE FOR AN OPTICAL INFRARED IMAGE OBSERVATION SYSTEM

BACKGROUND OF THE INVENTION

The invention relates to a self alignment device for an optical infrared image observation system for controlling a picture taking system, and particularly an optical system, with respect to a given direction. The invention finds particularly interesting applications in airborne picture taking and sighting systems on board mobile missiles.

For infrared image observation (3-5 micrometers, 8-12 micrometers etc.) numerous optical systems have been developed. They are often called FLIR (forward looking infrared) when their resolution allows a television type video image to be obtained. These systems may be broken down into two subassemblies: a focusing optical system and a camera subassembly.

The camera subassembly includes the following elements: a cooled infrared detector block, a scanning system and an internal optical system for analysing the image plane of the focusing optics (intermediate image plane).

These systems are often placed in very severe environments (vibrations, thermal stresses) which may give rise to movements of the optical systems mentioned above (focusing optics, camera subassemblies), with respect to each other or deformations of said systems. That may cause an appreciable degradation of their functional performance with respect to their values at rest.

One of the most fundamental requirements is optical alignment of such as system with respect to a given direction of space or of the equipment. A name commonly used is the term "sighting line". In addition, in the case of an articulated system, this alignment may have a direction different from that desired because of the optical, mechanical and electrical imperfection of the movements used. In the operational functioning of some of these systems these deformations are critical with respect to the desired performances (very accurate deviation measurement with respect to the target) and may therefore impair the operation of the system.

The aim of the present invention is to be able to measure the amplitude of these deformations so as then to take them into account for correcting and controlling the sighting line position of these systems.

In the technique, systems are known for measuring these deformations. These systems use an auxiliary light source emitting a light beam through the optical system (focusing optical system) whose alignment it is desired to adjust with respect to the sighting line and an auxiliary detector for detecting the light beam emitted by the auxiliary light source. Semi-reflecting mirrors are further required for separating the light beam emitted by the light source from the beam coming from the object observed and received by the focusing optical system. These systems have the drawback of reducing the photometric performances of the system and of reducing the spectral band which can be used because of the presence of the semi-reflecting mirrors and the auxiliary light sources. In addition, the auxiliary light sources may be at the origin of light or parasite images disturbing the operation of these systems.

This is why the invention relates to a system for avoiding these drawbacks.

The system is based on the use of an effect observed with thermal detectors which are generally cooled. This so-called "narcissus" effect occurs when, during scanning of the image field, the detector sees its own image (or that of its cold diaphragm) obtained by self collimation on an optical diopter, cooled image on a warm background. This effect is reduced as much as possible during calculation of the optical combination of the focusing lens essentially by suppressing any surface close to self collimation for the sensitive surface.

The system of the invention has the particularity of using this "narcissus" effect which is usually harmful in scanned thermal optical systems.

SUMMARY OF THE INVENTION

The invention relates then to a self-alignment device for an optical infrared image observation system comprising:

an optical focusing input system receiving an infrared object beam and focusing in exchange an image beam in an image plane, a cooled infrared system for reading said image plane, for detecting the infrared radiation at a given temperature, receiving said image beam, detecting the optical intensity received and delivering in exchange a reading signal and further comprising a return mirror situated in said field aperture of the optical input focusing system having a fixed and oriented position so as to reflect back to the reading system its own image, a deviation measuring device receiving from the reading system a signal identifying said image of the reading system reflected back by the return mirror comprising a detection circuit for detecting the difference which may exist between the theoretical position of the mirror and the detected position and delivering in exchange a deviation signal.

BRIEF DESCRIPTION OF THE DRAWINGS

The different objects and features of the invention will be clearer from reading the following description with reference to the accompanying figures which show:

FIG. 1, a simplified optical infrared image observation system of the prior art;

FIGS. 2 and 3, scanning systems for optical infrared image observation systems known in the technique;

FIG. 4, an input focusing lens of the prior art;

FIG. 5, another input focusing lens with return mirrors of the prior art;

FIGS. 6 and 7, self alignment devices for optical infrared image observation systems;

FIG. 8, a simplified embodiment of the self alignment device for optical infrared image observation systems of the invention;

FIG. 9, an explanatory diagram of the operation of the self alignment device of the invention;

FIG. 10, a detailed embodiment of the self alignment device of the invention; and FIGS. 11 and 12, an example of dimensioning the self alignment device of the invention.

DETAILED DESCRIPTION OF THE INVENTION

FIG. 1 illustrates in a simplified way an infrared picture taking device according to an embodiment of the prior art.

An object light beam FO, coming from an object not shown situated on the left of the FIG. 1, is received by an optical input focusing system 1. This optical system is shown by way of example in the form of two lenses 13 and 14.

The optical input focusing system, 1, receiving the object beam FO, gives rise to an image beam FI which is focused in a detector plane 4. This detector plane 4 forms part of the camera CA which has devices for reading the image received in the detector plane 4. These devices are not shown in FIG. 1 and will be described with reference to FIG. 2.

The camera CA reads the image received and controls its display on a display screen VU or storage thereof in a recording device.

FIG. 2 gives one embodiment of the devices for reading camera CA.

In this Figure, we find again the input optical focusing system 1 receiving the object beam FO and retransmitting the image beam FI. The image beam FI is focused in a plane 10 which has been shown in the Figure but which is a fictitious plane.

Focusing of beam FI determines in plane 10 an elementary zone OE.

An optical analysis system 2 receives the beam FI. The elementary zone OE is therefore an object for the optical system 2. This latter focuses the light beam towards a bidimensional scanning system 31, 32 which sends the light beam to a photodetector block 4.

The scanning system comprises a mirror 31 orientatable about an axis ΔY (parallel to an axis OY) for scanning the plane 10 in a direction OZ (vertical direction in FIG. 2) and for picking up the light beams from elementary zones (OE) situated along the vertical line.

A regular polygonal diopter 32 rotates about an axis ΔX parallel to an axis OX. It allows plane 10 to be scanned, when mirror 31 is immobile, in a direction orthogonal to direction OZ.

The association of the movements, of mirror 31 and of diopter 32 allow plane 10 therefore to be scanned horizontally and vertically. The light from each elementary zone OE of plane 10 may therefore be retransmitted to the photodetector block 4. This latter scans plane 10 through the optical system 2, the pivoting mirror 31 and the diopter 32. The photodetector 4 may therefore detect the image transmitted by a beam FO to the optical input system 1.

The construction of the scanning system may also conform, as known in the technigue, to the embodiment shown in FIG. 3.

In this embodiment, a bidimensional scanning system comprises two mirrors 31 and 32 pivoting about two axes X and Z. This system combines optically elementary zones OE of plane 10 with the photodetector plane 4. The optical combination is achieved by means of a lens or more generally an objective 2, the planes 10 and photodetector 4 being disposed, respectively, in the object and image planes of objective 2.

Control means, not illustrated, cause mirrors 31 and 33 to rotate about their respective axis ΔX and ΔZ.

The movements of these mirrors are synchronized so as to scan the plane 10 in accordance with the predetermined scanning configuration. Most often the scanning will be of the television type, i.e. comprising the sequential scanning of the points of a line, for example along axis Y, and the sequential scanning of the lines, along the axis Z, so as to scan all the elementary zones of the object.

The photodetector converts light energy detected into an electric signal transmitted to a signal processing circuit not shown whose output feeds a display device V, for example a cathode ray screen.

Buffer storage means must naturally be provided for adapting the speed of the mechanical scanning to that of the electronic scanning used for a cathode ray screen.

Remanence display means may also be used.

In numerous applications such optical infrared image observation systems must be aligned with respect to a fixed or given direction. This is particularly the case when the optical observation system is linked to the scanning of other equipment. The sighting direction of the optical observation system must then be slaved to the position of this equipment.

Principally, the axis of the optical input focusing system 1 must be parallel to a given direction. It is a question then of measuring any difference which may exist between the axis of the optical system and said direction. Knowing this difference, the image received by the optical observation system is corrected or else slaving of the optical input system 1 is controlled or any other device for modifying this alignment.

An optical focusing input system may be an objective of linear design such as the one shown in FIG. 4 and comprising lenses L1 and L4 focusing an input beam on plane 10.

It may also be of bent even articulated design as is shown in FIG. 5. It then comprises, for example, a series of lenses L1 to L11 with, inserted between these lenses, mirrors M1 to M4 inclined suitably for focusing an incident beam in plane 10. One or more mirrors M1 and M4 may be articulated for orienting the field of vision of the objective.

The mount of an objective, whether it is of the type shown in FIG. 4 or in FIG. 5, is subjected to thermal and mechanical stresses which may modify the orientation of its optical axis. An objective of the type shown in FIG. 5, because of its greater complexity, is apparently more sensitive to such stresses. This is why, systems are provided for modifying the orientation of the optical axes of these objectives. In the technique, systems are known for also slaving the optical axis of the camera objectives to a fixed direction.

Thus in FIG. 6, on each side of an optical input system 1 whose optical axis XO is to be locked to a fixed direction, two mirrors inclined at 45° 80 and 90 are placed on the optical axis xO. A light source 91 directs the light beam onto mirror 90 which reflects it to the lenses 13 and 14 of the optical system 1, which retransmits the beam to mirror 80 which reflects it to a detector 82 through a focusing lens 81.

The source, the mirrors 80 and 90 and detector 82 are rigorously fixed and determine a direction in which the optical axis of the optical system 1 should be locked. Should the axis of the optical system 1 shift with respect to this direction, detector 82 detects this shift and may carry out the necessary corrections.

It should be noted that source 91 and detector 82 may be reversed.

In FIG. 7 has been shown another type of alignment device of the type known in the technique. In this device, source 91 and detector 93 are placed on the same side with respect to the optical system 1. They are coupled to the optical system 1 by two semireflecting mirrors 90 and 92 disposed at 45°. On the side opposite the optical system is disposed, in the path of a light beam coming from source 91, a semireflecting mirror 83 which reflects back the light beam to the detector 93.

Detectors 91 and 93, mirrors 90, 92 and 83 are rigidly fixed. They determine a direction of alignment in which the axis of optical system 1 must be aligned.

The drawback of the systems thus described resides in the fact that they require an auxiliary source (91) and possibly an auxiliary detector which may cause disturbances, such as parasite images due to the parasite light or else reduce the photometric performances of the system because of the presence of additional optical devices such as the semireflecting mirrors.

The invention overcomes these drawbacks by using the so called "narcissus" effect, in which a photodetector may in some cases of use see its own image, because of the parasite reflections which a man skilled in the art tends to suppress as much as possible.

Referring to FIG. 8 a simplified embodiment will be described of a self alignment device for an optical infrared image observation system in accordance with the invention.

In this FIG. 8, the optical input focusing system 1 has been simply shown by a single lens with optical axis xO. This lens receives, from an object to be observed, an object beam FO and focuses an image beam on a detection device 4 of a thermal camera.

A small size mirror 5 is placed in front of the optical input system 1 on the side opposite the thermal camera CA. The mirror is rigidly fixed to a mechanical structure not shown which gives a mechanical alignment reference.

A deviation measuring system 6 is connected to the thermal camera CA and receives the image received by the thermal camera CA.

A display device VU is also connected to the camera for displaying any image received by the camera. Mirror 5 sends back to detector 4 its own image (narcissus effect) It is inclined at an angle $\theta$ with respect to the alignment axis x0 so that the narcissus image of the detector is situated at the edge of the field covered by the optical system and scanned by the thermal camera: the mirror is in self collimation for a particular direction of the object field of the optical system.

Any deformation or displacement of the optical system 1 produces a positional deviation of the return image from the detector with a double amplitude with respect to the alkignment fault existing in the sighting line.

As is shown in FIG. 9, if the position of the axis of the optical system 1 is x1 instead of x0, thus having a shift $\Delta P$, the image in the plane of the phtodetector of the mirror will be x'1 instead of x'0 thus leading to detecting a shift of $2\Delta P$.

Measurement of this deviation or slaving of the narcissus image of the detector to its nominal position by means of the auxiliary deviation measuring system and a mobile element of the optical system (slaved mirror, scanning voltage of the camera, etc..) may allow the position of this sighting line to be known or a very accurate alignment of the optical system to be held.

Should the focusing optical system be articulated (wide deflection field scanning, slaving of the position on a mobile object with respectto objective-camera assembly) the system described also functions. Knowing the deformation caused nominally on the optical system, the theoretical position of the return image of the detector may be deduced in the image plane and the deviation measuring system must operate with respect to this reference point whichis no longer fixed in time. This system allows then both the uncontrolled (vibrational, thermal) and controlled (modification of the system by displacement or rotation of one or more elements, shift of the scanned image plane . . . ) to be controlled and corrected. Because of its positioning at the edge of the useful field of the camera, the narcissus image does not hinder the operation of the optical system which uses a central portion of the image (deviation measurement with respect to the target for example).

In the example of construction shown in FIG. 8, the deviation measuring system 6 calculates the deviation detected in the position of the axis of the optical system 1. It delivers a corresponding signal to an image correction circuit VU1 which controls the display device VU so that it displays a correctly centered image.

Referring to FIG. 10, a detailed embodiment of the invention will now be described using a scanning system of the type described with reference to FIG. 2.

We find again in this figure the same elements bearing the same references as those in FIG. 2. In addition, there is mirror 5 situated in the field of the optical system 1. This mirror is fixed to a rigid structure, not shown, serving as geometrical reference for the system.

A control circuit 30 controls the rotation of the diopter 32 and the oscillation of mirror 31 and thus allows scanning of plane 10 by photodetector 4 to be obtained.

The photodetector 4 is situated inside a cold enclosure not shown cooling the photodetector to a temperature allowing it to readily detect the infrared radiation. By way of example, the photodetector 4 may be placed in an enclosure filled with liquid nitrogen for obtaining a temperature of 77° Kelvin.

Because of the scanning of mirror 31 and of diopter 32, the photodetector 4 at regular intervals sees its image in mirror 5. Since the photodetector 4 is at a low temperature (77° Kelvin in the example chosen), it receives its return image at a temperature substantially the same and readily identifies it with respect to the rest of the image received in the infrared. The considerable temperature transition between the infrared image and the return image of the photodetector allow this latter to be readily detected.

A deviation measuring system 6 is connected to the photodetector 4 which transmits thereto a signal on each detection of its own image. System 6 is also connected to the control circuit 30 and receives therefrom scanning coordinate signals. On each detection of a return image from the photodetector, the deviation measuring system knows the position of the scanning members (mirror 31 and diopter 32) and therefore knows the position of mirror 5 with respect to the whole of the system and more particularly with respect to the optical input system 1.

Moreover, the deviation measuring system knows the theoretical position (in the rest position) of mirror 5 with respect to the optical input system 1. The deviation measuring system calculates then the difference of position which may exist between the real position of mirror 5 and the theoretical position. Depending on the difference found, it delivers a deviation signal to an alignment control circuit which controls the mechanical alignment of the optical system 1.

In the case where the optical system 1 is an objective of the type shown in FIG. 4, the alignment adjustment consists in moving the objective.

In the case where the optical system 1 is an objective of the type shown in FIG. 5, th ealignment adjustment consists in orientating one or more mirrors of the objective.

It should be noted that in the case where the objective shown in FIG. 5 is articulated. it may observe in different directions. However the control system 30 of FIG. 10 knows the observation direction and communicates it to the deviation measuring system. This latter is then able to know the theoretical position of mirror 5 in the new sighting direction whic still allows alignment of the optical system 1 to be made in the same way.

It should also be noted that instead of acting on the alignment adjustment of the optical system 1 the deviation measuring system could act as described in connection with FIG. 8 on the centering of the image displayed on a display device.

Referring to FIGS. 11 and 12 one example of dimensioning and orientating mirror 5 will be described adapted to a commercial optical system.

In the example taken the optical input system has a focal distance f=800 mm and covers a circular field of diameter D=56 mm therefore an angular field of $\beta = \pm 2°$ with an input pupil of a diameter $\phi_p=100$ mm.

If we assume that a perfect mirror (coefficient of reflection R=100%) covering the whole of the pupil gives a flux variation $\Delta \phi_0$ through the optical system between the Narcissus image and the background. If we also assume that the dynamic positioning system operates under good conditions with an image flux different from the background flux by a value $\Delta \phi_1$. We will assume for example that $\Delta \phi$ is a hundred times smaller than $\Delta \phi_0$.

For calculating the dimensions of the mirror we take on the other hand a factor of reflection R=95%. The useful area of the small mirror is then given by the formula $$S_A = \frac{S_p \cdot \Delta \phi_1}{R \cdot \Delta \phi_0}$$

in which $\Delta \phi_1 = 10^{-2} \times \Delta \phi_0$
$S_p = \pi/4 \ \phi_p^2$ (suface of the input pupil)
R=0.95

Mirror 5 is obtained having an area of about 83 mm².

In the case of a circular mirror, it is suitable to take a mirror having a diameter D=about 10.3 mm.

If we assume that it is desired to measure alignment variations of a maximum amplitude of +0.2 degree, the return mirror may then be positioned with a slant, with respect to the optical reference axis of the system, of $\alpha = 1.75°$.

If we consider that the image plane of the system of the invention is circular, its radius of value D/2 corresponds to an angle of $\beta = 2$ degrees. The center of the working zone of the deviation measurer is situated at a distance b from the center of the image plane corresponding to the angle $\alpha = 1.75$ degrees. This working zone is circular and has as radius c a value corresponding to an angle of 0.2 degree.

What is claimed is:

1. A self-alignment device for an optical infrared image observation system comprising:
    an optical input focussing system receiving an infrared object beam and focussing in exchange an image beam in an image plane;
    an infrared cooled system for reading said image plane at a given temperature for detecting the infrared radiation, receiving said image beam detecting the optical intensity received and delivering in exchange a reading signal, and further including
    a return mirror situated in said field aperture of the optical input focussing systems, in a fixed and orientated position so as to send back to the reading system its own image;
    a deviation measuring device receiving from the reading system a signal identifying said image of the reading system sent back by the return mirror having a detection circuit for detecting the difference which may exist between the theoretical position of the mirror and the detected position and delivering in exchange a difference signal.

2. The self-alignment device as claimed in claim 1, wherein the optical input system has alignment control means and wherein the difference signal delivered by the deviation measuring device is transmitted to these control means.

3. The self-alignment device as claimed in claim 1, wherein the deviation measuring device calculates the coordinates of the detected difference and delivers two signals at least of difference coordinates to the alignment control means.

4. The self-alignment device as claimed in claim 3, wherein the deviation measuring device delivers two signals at least of difference coordinates to the image correction circuit.

5. The self-alginment device for an optical infrared image observation system as claimed in claim 1, wherein the infrared analysis system includes:
    an optical system for analysing said image plane,
    a scanning system having a given field aperture for scanning, during elementary times, at least the image plane through the optical analysis system,
    an infrared photodetector block cooled to a given temperature for detecting the infrared radiation, receiving from the scanning system, at each elementary time, a fraction of said image beam, detecting the optical intensity of each fraction of the image beam received and delivering in exchange a reading signal,
    and wherein
    the return mirror is situated in said field aperture of the scanning system, in a fixed and oriented position so as to send back its own image to the photodetector block,
    the deviation measuring device receives from the photodetector block a signal identifying said image of the photodetector block sent back by the return mirror as well as, from the scanning system, the elementary time identifying said image, and has a computing circuit for calculating the difference which may exist between the theoretical position of the mirror and the detected position and delivering in exchange a difference signal.

6. The self-alignment device as claimed in claim 5, wherein the return mirror is seen by the photodetector block through the scanning system, the optical analysis system and the input optical input focussing system.

7. The self-alignment device as claimed in claim 5, wherein the return mirror is placed in the scanning field of the scanning system at a point situated adjacent the periphery of the scanning field.

8. The self-alignment device as claimed in claim 5, including means for displaying the image received by the optical input focussing system, the optical analysis system, the scanning system, the infrared photodetector block, wherein said display means comprise an image correction circuit and the deviation measuring device transmits said difference signal to the image correction circuit.

* * * * *